(12) United States Patent
Browne

(10) Patent No.: US 6,972,764 B1
(45) Date of Patent: Dec. 6, 2005

(54) METHOD AND APPARATUS FOR TRANSFORMING A SET OF CLOSED CURVES

(75) Inventor: Cameron Bolitho Browne, Burleigh Heads (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/379,729

(22) Filed: Aug. 24, 1999

(30) Foreign Application Priority Data

Aug. 28, 1998 (AU) ...................................... PP5577

(51) Int. Cl.[7] ............................................. G06T 11/00
(52) U.S. Cl. ...................................... 345/467; 345/470
(58) Field of Search ................................ 345/636, 467, 345/419, 420, 470

(56) References Cited

U.S. PATENT DOCUMENTS 5,701,404 A   12/1997   Stevens et al. ............. 395/123
5,805,783 A * 9/1998   Ellson et al. ............... 345/419
5,856,828 A * 1/1999   Letcher, Jr. ................. 345/420

OTHER PUBLICATIONS

Beall et al., Inside AutoCAD 14, New Riders Publishing, cd-rom, chapters 16-17, Jul. 1997.*

* cited by examiner

*Primary Examiner*—Chanh Nguyen
*Assistant Examiner*—Motilewa Good-Johnson
(74) *Attorney, Agent, or Firm*—Fitzpatrick, Cella, Harper & Scinto

(57) ABSTRACT

The preferred method transforms a set of closed curves, such as a typeface, font, or character. The method projects a pattern of continuous curves over the closed curves (502). The method then determines a set of intersection points of the closed curves and continuous curves (506). Cross-over points are then determined from the set of intersection points (508). Closed loops are then assembled from the cross-over points to form the transformed typeface, font or character (510).

57 Claims, 15 Drawing Sheets

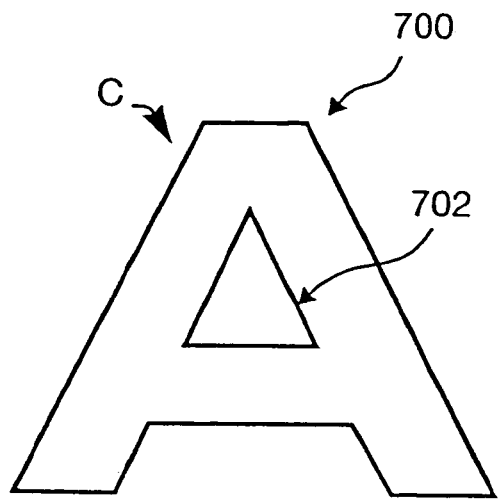
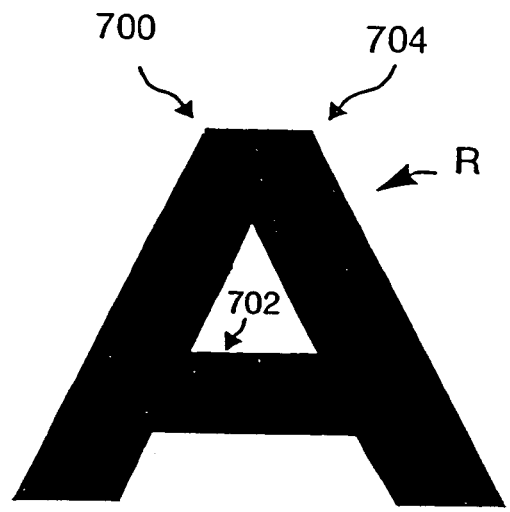
Fig. 7A          Fig. 7B
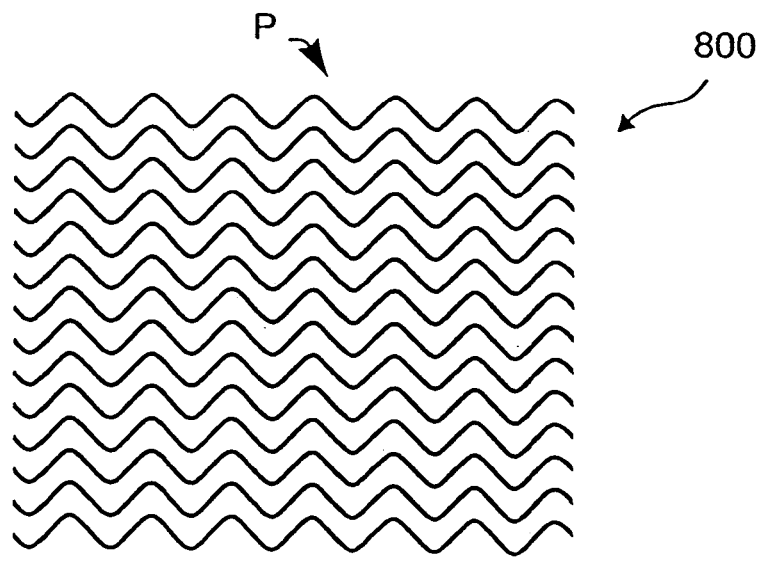
Fig. 8

METHOD AND APPARATUS FOR TRANSFORMING A SET OF CLOSED CURVES

FIELD OF INVENTION

The present invention relates to a method and apparatus for transforming a set of closed curves. The invention also relates to a computer program product comprising a computer readable medium including a computer program for transforming a set of closed curves.

BACKGROUND OF INVENTION

In the fields of computational geometry and graphics, it is often desirable to modify the shape of an object in some consistent, reproducible and controllable manner, to produce a result that satisfies some criteria regarding shape or form. Such criteria might include the transformation of shapes to those that are considered to be more artistically appealing or complex, but still retain the basic shape of the original outline.

For instance, it may be desirable to transform a computer typeface or font defined by character shape outlines to produce more interesting and artistically pleasing results, where the basic overall outline shapes are maintained so that readability is not lost.

The publication U.S. Pat. No. 5,701,404 discloses a method for trimming non-uniform rational B-spline surfaces according to curves projected onto them. However, this method suffers from the disadvantage that the basic overall shape of the original outline is not always retained.

SUMMARY OF THE INVENTION

It is an object of the present invention to ameliorate one or more disadvantages of the prior art.

According to one aspect of the invention there is provided a method for transforming a set of closed first curves defined on a surface, wherein the first curves contain no self-crossover points, the method comprising the steps of: (i) providing a pattern comprising a set of continuous second curves for projection over the set of first curves upon the surface, wherein the second curves contain no self-crossover points; (ii) determining a set of intersection points of the set of first curves with the set of second curves; (iii) determining a set of crossover points within the set of intersection points; and (iv) selecting curve intervals, delimited by the crossover points, from the set of first curves and the set of second curves in accordance with a predetermined rule to form closed loops; wherein the closed loops form said transformed set of closed curves.

According to another aspect of the invention there is provided apparatus for transforming a set of closed first curves defined on a surface, wherein the first curves contain no self-crossover points, the apparatus comprising; providing means for providing a pattern comprising a set of continuous second curves for projection over the set of first curves upon the surface, wherein the second curves contain no self-crossover points; a first determining means for determining a set of intersection points of the set of first curves with the set of second curves; a second determining means for determining a set of crossover points within the set of intersection points; and a first selecting means for selecting curve intervals, delimited by the crossover points, from the set of first curves and the set of second curves in accordance with a predetermined rule to form closed loops; wherein the closed loops form said transformed set of closed curves.

According to still another aspect of the invention there is provided a computer program product comprising a computer readable medium including a computer program for transforming a set of closed first curves defined on a surface, wherein the first curves contain no self-crossover points, the the computer program product comprising; providing means for providing a pattern comprising a set of continuous second curves for projection over the set of first curves upon the surface, wherein the second curves contain no self-crossover points; a first determining means for determining a set of intersection points of the set of first curves with the set of second curves; a second determining means for determining a set of crossover points within the set of intersection points; and a first selecting means for selecting curve intervals, delimited by the crossover points, from the set of first curves and the set of second curves in accordance with a predetermined rule to form closed loops; wherein the closed loops form said transformed set of closed curves.

According to another aspect of the present invention there is provided a method of modifying a typeface, font, or character, wherein said typeface, font, or character comprises a set of closed first curves, wherein the set of first curves contain no self-crossover points, the method comprises the steps of: projecting a pattern comprising a set of continuous second curves over the set of first curves, wherein the set of first curves contain no self-crossover points; determining a set of intersection points of the set of first curves with the set of second curves; determining a set of crossover points within the set of intersection points; and selecting curve intervals, delimited by crossover points, from the set of first curves and the set of second curves to form a set of closed third curves, wherein said set of closed third curves form a modified said typeface, font, or character.

According to another aspect of the present invention there is provided an apparatus for modifying a typeface, font, or character, wherein said typeface, font, or character comprises a set of closed first curves, wherein the set of first curves contain no self-crossover points, the apparatus comprising: means for projecting a pattern comprising a set of continuous second curves over the set of first curves, wherein the set of first curves contain no self-crossover points; means for determining a set of intersection points of the set of first curves with the set of second curves; means for determining a set of crossover points within the set of intersection points; and means for selecting curve intervals, delimited by crossover points, from the set of first curves and the set of second curves to form a set of closed third curves, wherein said set of closed third curves form a modified said typeface, font, or character.

According to another aspect of the present invention there is provided a computer program product comprising a computer readable medium including a computer program for modifying a typeface, font, or character, wherein said typeface, font, or character comprise a set of closed first curves, wherein the set of first curves contain no self-crossover points, the computer program product comprising: means for projecting a pattern comprising a set of continuous second curves over the set of first curves, wherein the set of first curves contain no self-crossover points; means for determining a set of intersection points of the set of first curves with the set of second curves; means for determining a set of crossover points within the set of intersection points; and means for selecting curve intervals, delimited by crossover points, from the set of first curves and the set of second curves to form a set of closed third curves, wherein said set of closed third curves form a modified said typeface, font, or character.

According to another aspect of the present invention there is provided a method of modifying a typeface, font, or character, wherein said typeface, font, or character comprises a set of closed first curves, wherein the set of first curves contain no self-crossover points, the method comprises the steps of: projecting a pattern comprising a set of continuous second curves over the set of first curves, wherein the set of first curves contain no self-crossover points; determining a set of intersection points of the set of first curves with the set of second curves; determining a set of crossover points within the set of intersection points; selecting unmarked adjacent crossover points to a form a closed loop; marking the selected adjacent crossover points; and repetitively performing the selecting and marking steps until a set of said closed loops have been formed, wherein said closed loops form a modified typeface, font, or character.

According to another aspect of the present invention there is provided an apparatus for modifying a typeface, font, or character, wherein said typeface, font, or character comprises a set of closed first curves, wherein the set of first curves contain no self-crossover points, the apparatus comprising: means for projecting a pattern comprising a set of continuous second curves over the set of first curves, wherein the set of first curves contain no self-crossover points; means for determining a set of intersection points of the set of first curves with the set of second curves; means for determining a set of crossover points within the set of intersection points; means for selecting unmarked adjacent crossover points to a form a closed loop; means for marking the selected adjacent crossover points; and means for repetitively performing the operations of the selection and marking means until a set of said closed loops have been formed, wherein said closed loops form a modified typeface, font, or character.

According to another aspect of the present invention there is provided a computer program product comprising a computer readable medium including a computer program for modifying a typeface, font, or character, wherein said typeface, font, or character comprises a set of closed first curves, wherein the set of first curves contain no self-crossover points, the computer program comprising: means for projecting a pattern comprising a set of continuous second curves over the set of first curves, wherein the set of first curves contain no self-crossover points; means for determining a set of intersection points of the set of first curves with the set of second curves; means for determining a set of crossover points within the set of intersection points; means for selecting unmarked adjacent crossover points to a form a closed loop; means for marking the selected adjacent crossover points; and means for repetitively performing the operations of the selection and marking means until a set of said closed loops have been formed, wherein said closed loops form a modified typeface, font, or character.

BRIEF DESCRIPTION OF THE DRAWINGS

Embodiments of the invention are described with reference to the drawings, in which:

FIG. 7A illustrates the set of closed curves C of character "A";

FIG. 7B illustrates the filled counterpart of FIG. 7A;

FIG. 8 illustrates an example pattern P composed of parallel sinusoidal curves;

DETAILED DESCRIPTION

Preferred Embodiment of Method(s)

Figure 1A:
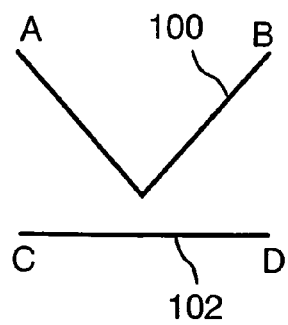
FIGS. 1A to 1C illustrate the concept of a crossover point.

Some portions of the detailed descriptions which follow are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms, such as fonts, typefaces or characters, are to be associated with the appropriate physical quantities and are merely convenient labels applied to these quantities. Unless specifically stated otherwise as apparent from the following discussions, it is appreciated that throughout the present invention, discussions utilizing terms such as "selecting", "determining", "generating", "providing", "comparing", "orientating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The structure of a conventional general purpose computer will appear from the description below.

In addition, the present invention also relates to a computer program product comprising a computer readable medium including a computer program for orientating a space curve. The computer readable medium is taken herein to include any transmission medium for transmitting the computer program between a source and a designation. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. The computer program is not described with reference to any particular programming language and implementation thereof. It will be appreciated that a variety of programming languages and implementations thereof may be used to implement the teachings of the invention as described herein.

Before proceeding with a description of the embodiments, a brief review of terminology used hereinafter is provided.

Figure 1B:
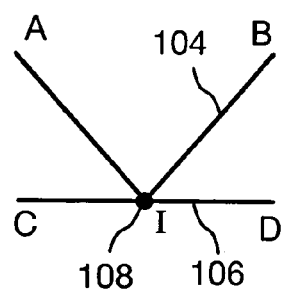
Figure 1C:
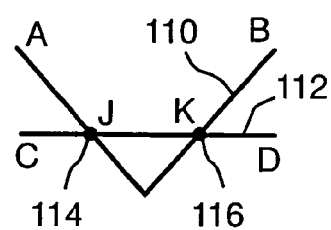

FIGS. 1A to 1C illustrate the concept of the term "crossover point". In FIG. 1A, curves AB 100 and CD 102 do not contain any intersection or crossover points. In FIG. 1B, curves AB 104 and CD 106 intersect at point 1108 but do not crossover. In FIG. 1C, curves AB 110 and CD 112 have two intersection points J 114 and K 116, which are both hereby classed as being crossover points.

Figure 2A:
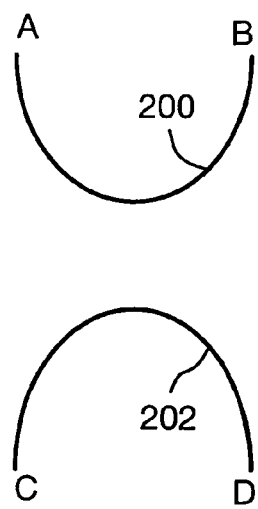
FIGS. 2A to 2C further illustrate the concept of a crossover point.
Figure 2B:
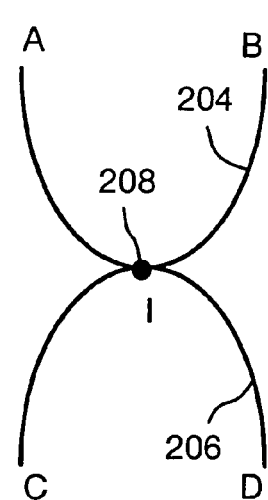
Figure 2C:
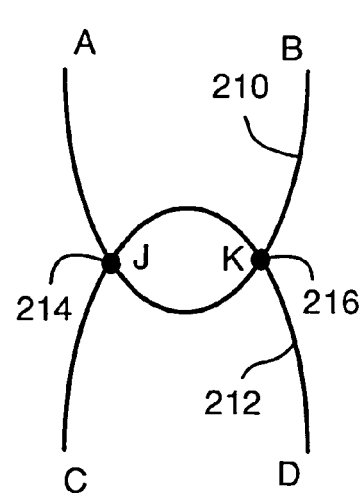

This concept is further illustrated in FIGS. 2A to 2C, where an identical case is shown for differently shaped curves. In FIG. 2A, curves AB 200 and CD 202 contain no intersection or crossover points. In FIG. 2B, curves AB 204 and CD 206 contain one intersection point 1208 but no crossover points. In FIG. 2C, curves AB 210 and CD 212 contain two intersection points J 214 and K 216, which are both also crossover points.

Figure 3A:
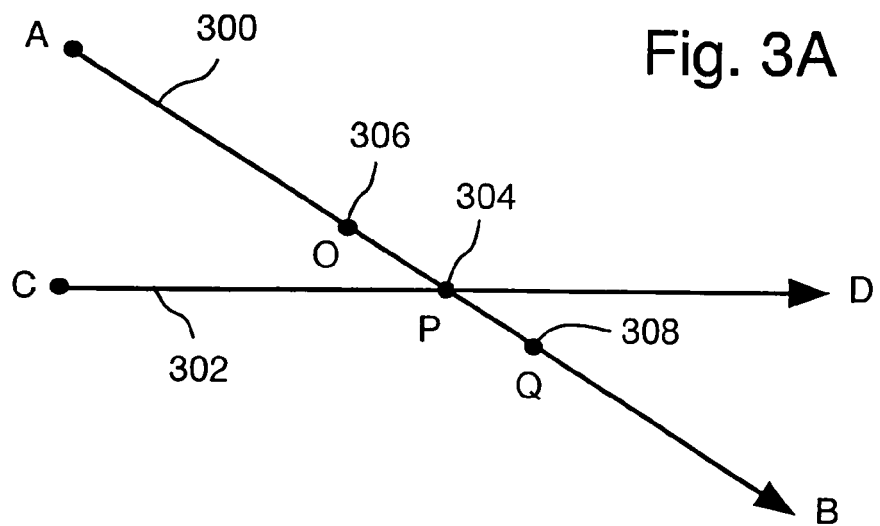
FIGS. 3A and 3B illustrate the definition of a crossover point, and a special case of crossover.

FIG. 3A illustrates in more formal terms the definition of a "crossover point". Curves AB 300 and CD 302 intersect at point P 304. Examining point 0306 along AB immediately prior to the intersection point P, and point Q 308 along AB immediately following the intersection point P, it is observed that O and Q lie on opposite sides of curve CD, that is, curve AB has "crossed over" curve CD at point P. Similarly, it can be said that curve CD has "crossed over" curve AB. Intersection points exactly define crossover points, but not all intersection points are necessarily crossover points. The complete set of crossover points between a first set of curves C and a second set of curves P is referred to as a crossover set X. A closed curve which crosses over itself and thus intersects itself, is referred to as a self-crossover.

Figure 3B:
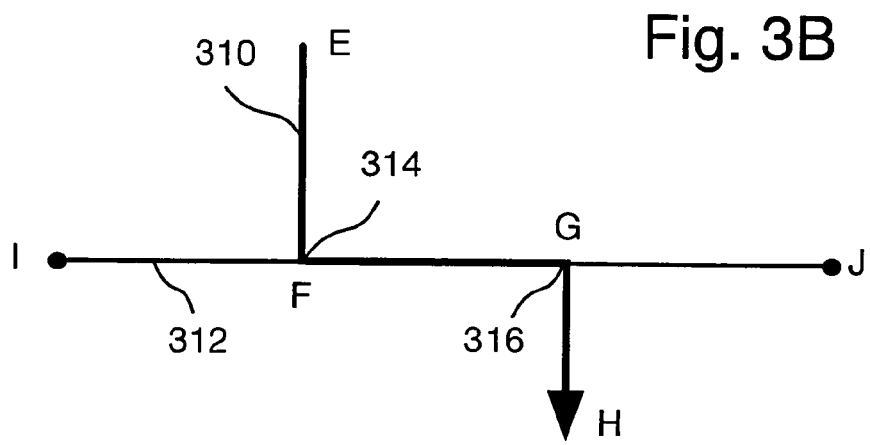

FIG. 3B illustrates a special case of curves EFGH 310 and IJ 312 that share a common interval between points F 314 and G 316. Points F and G and all points within the interval FG are intersection points. However, there is only one crossover along this interval FG, so a single point from this interval must be chosen to represent the crossover point. To maintain consistency and ensure a reproducible result, the convention used in the preferred embodiment is that the first point encountered along the shared interval is chosen as the crossover point, point F 314 in this case.

Figure 4A:
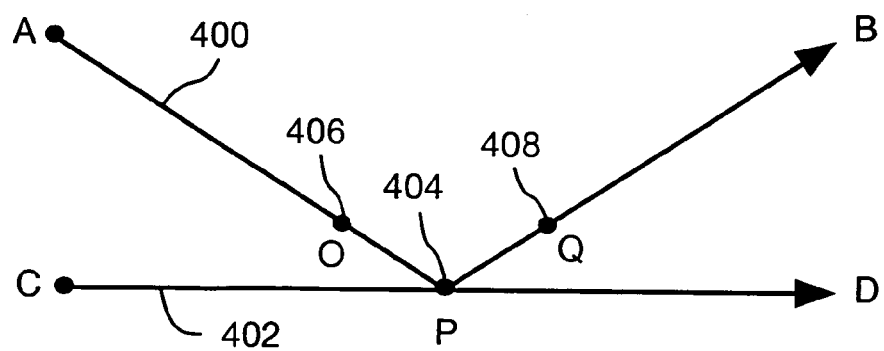
FIG. 4A illustrates an intersection point that is not a crossover point.

FIG. 4A illustrates the case of an intersection point that is not a crossover point. Curves AB 400 and CD 402 intersect at point P 404. However, in this case it is observed that point 0406 along AB immediately prior to the intersection point P, and point Q 408 along AB immediately following the intersection point P, both lie on the same side of curve CD, that is, curves AB and CD have not crossed over.

Figure 4B:
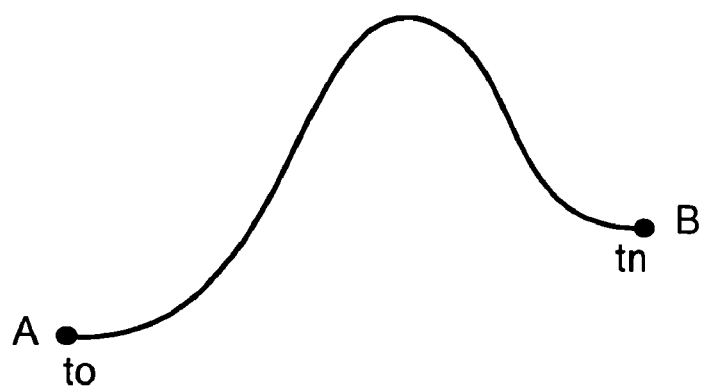
FIGS. 4B and 4C illustrate an example of the forward and backward direction for a closed curve C.

FIG. 4B illustrates the concept of positive and negative direction for an open continuous curve. The open continuous curve AB is represented in a parametric form x=f(t), y=g(t) having a parameter t commencing at to and terminating at $t_n$. The direction from $t_0$ to $t_n$ along the curve AB is defined as the positive direction where $t_0 < t < t_n$. The negative direction is defined as that direction along the open curve AB which is opposite to the positive direction. Of course, the actual direction of the positive direction of a curve AB is dependent upon the choice of parametric functions.

Figure 4C:
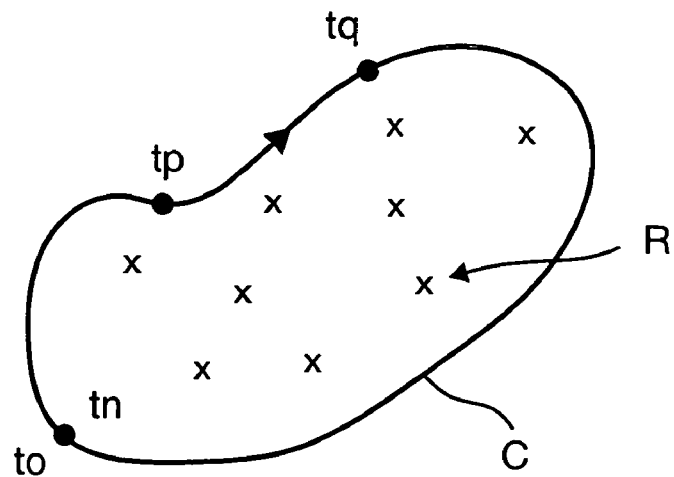
Figure 4D:
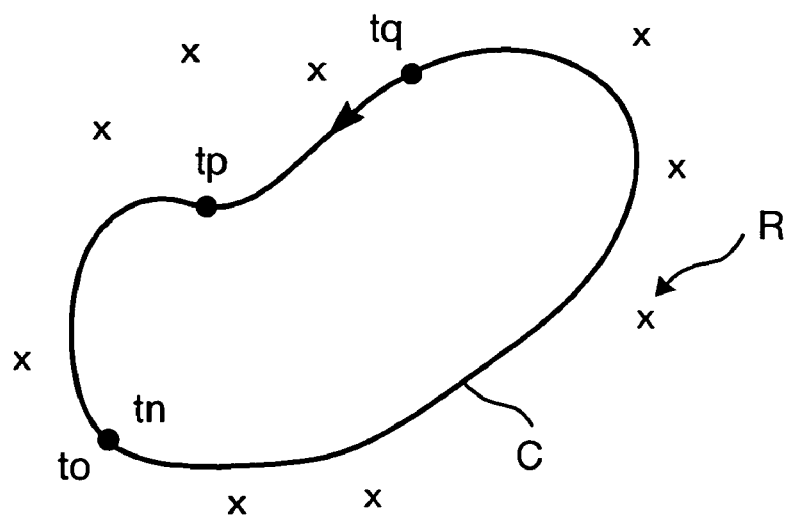
FIG. 4D illustrates the concept of positive and negative direction for an open continuous curve.

FIGS. 4C and 4D illustrate an example of the forward and backward direction of a closed continuous curve C. The forward direction of a closed curve C which bounds an object R is defined herein as that direction along the closed curve C which has the object on a specified side. The backward direction of the closed curve C is defined herein as that direction along the closed curve C which has the object on the side opposite to the specified side. In the examples given herein, the specified side is the right hand side. In FIG. 4C, the object R bounded by the curve C is located inside the curve C. Thus the forward direction is along the curve C in the direction $t_p$ to $t_q$. In FIG. 4D, the same curve C is shown. However, the object R bounded by the curve C is located outside the curve C. Thus, the forward direction in these circumstances is from $t_q$ to $t_p$. In these examples, it can be seen that the forward direction is in a clockwise direction where the closed curve C bounds the object R within its interior and that the forward direction is in the anti-clockwise direction where the closed curve C bounds the object R on its exterior. Alternatively, the specified side may be chosen as the left hand side. In this case, the forward directions of FIGS. 4C and 4D are consequently reversed. Whatever alternative is chosen, it should be used consistently throughout the preferred method to ensue reproducibility.

Figure 5:
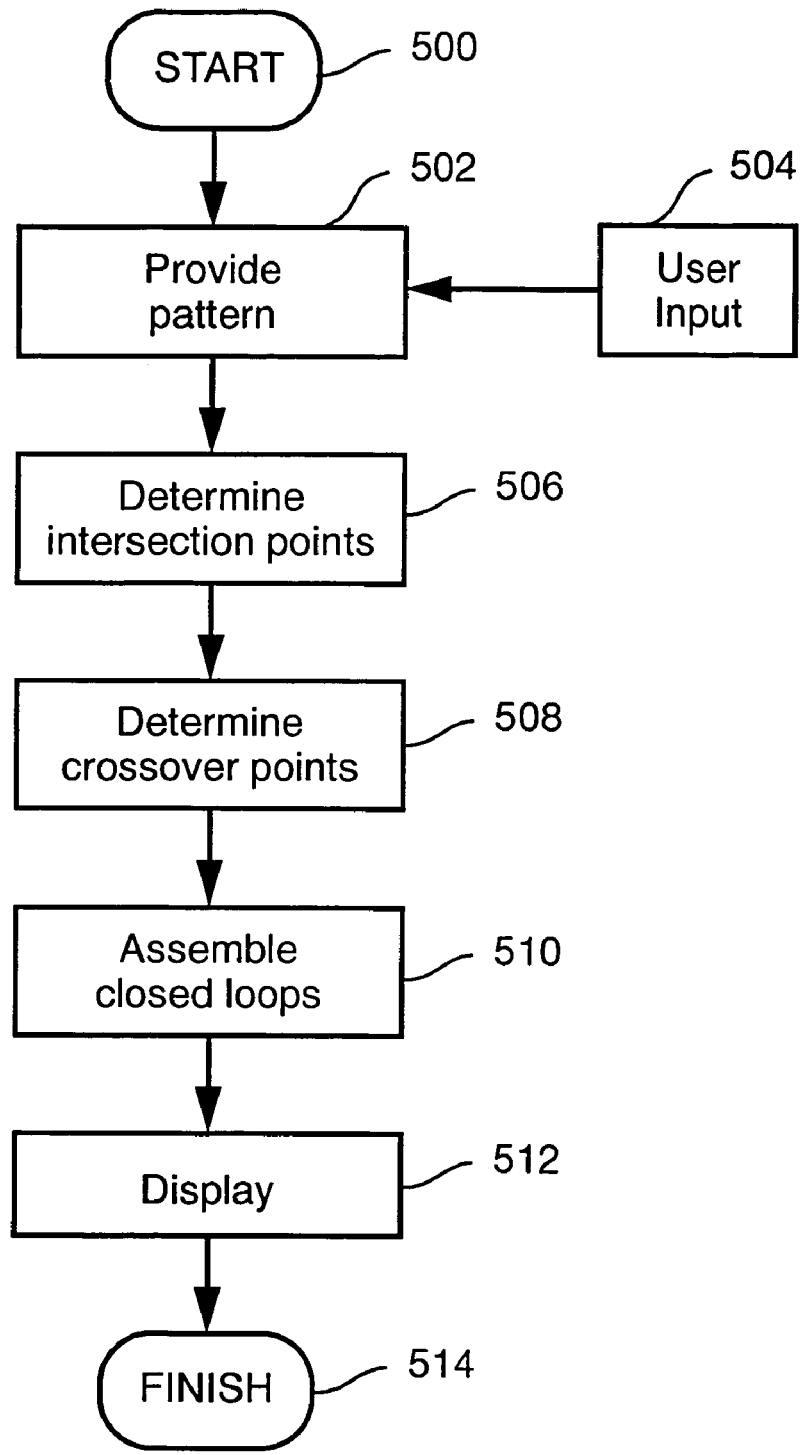
FIG. 5 is a flow diagram of the preferred method for transforming a set of closed curves.

Now turning to FIG. 5, there is illustrated a flow diagram of the preferred method for transforming a set of closed first curves defined on a surface. The preferred method is described with reference to 2-dimensional examples, in particular the orientation of 2-dimensional curves that describe the paths of stroke-based typeface characters. However, the principles of this invention have general applicability to n-dimensional space curves and are not intended to be limited to 2-dimensional curves only.

In step 500 of the preferred method, the process commences and a set of closed first curves defined on a 2-dimensional planar surface is inputted. Alternatively, the set of closed first curves may be defined on a 3-dimensional surface, where a 3-dimensional effect is desired. FIGS. 7A and 7B illustrate a typical example of a set of closed first curves. Specifically, FIG. 7A illustrates a character glyph of a font described by its outline path 700. FIG. 7B illustrates its filled counterpart that describes a region R 704 enclosed by the outline path 700. In FIGS. 7A and 7B the outline path 700 describes a set of curves C, which are continuous closed curves that contain no self-crossovers. The set of curves may include holes in the outline shape 702, typically represented in industry standard typefaces by curves oriented in the opposite direction to exterior curves. The shape of C dictates the overall shape of the transformed result.

In step 502, a pattern including a set of second curves is generated in response to user input 504. FIG. 8 illustrates a typical example of a pattern including a set of second curves that lie on the same surface as C, and constitute such a pattern P 800. The constituent curves of P may be open-ended, but within the region R they are continuous and contain no self-crossovers or intersections between members of P. The pattern P may be generated by an implicit function, and parameterized to describe characteristics such as base shape, period, amplitude, gradient, and so on. The pattern P need only be generated for the region R, increasing efficiency. Alternatively, the pattern P may be retrieved from storage means.

Figure 11A:
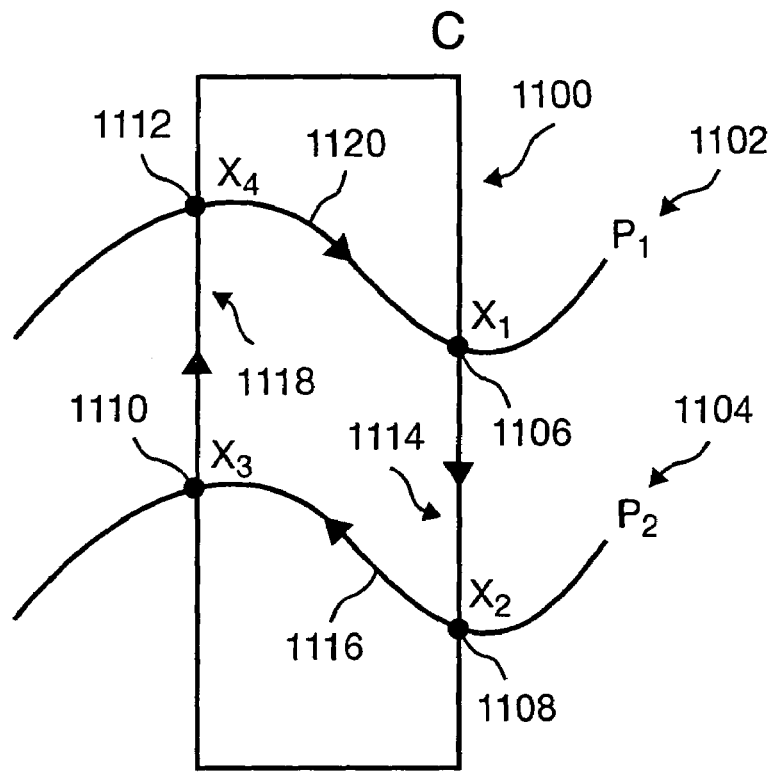
FIGS. 11A and 11B illustrate the crossover points and curve intervals formed by the intersection of a closed curve set C and pattern P, and the resulting shape C'.

In the next step 506, the intersection points of the set of first curves C and the set of second curves P are determined. The intersection step can be performed efficiently through the use of standard computational methods such as local neighborhood search, or ordering curve segments by coordinate and performing scanline traversal. FIG. 11A illustrates the intersections of a set of closed first curves C and a set of pattern curves P. Specifically, FIG. 11A shows one closed curve C 1100 and a set of pattern curves P composed of curves $P_1$ 1102 and $P_2$ 1104. In the step 506, firstly all the intersection points $X_1, X_2, X_3$ and $X_4$ between C and P are determined.

In the next step 508, a set of crossover points X is determined from the set of intersection points. In this step 508, each intersection point is tested for crossover, resulting in the crossover point set X composed of $X_1$ 1106, $X_2$ 1108, $X_3$ 1110 and $X_4$ 1112. As the curve C is continuous, closed, and contains no self-crossovers, and as the curves P are continuous and contain no self-crossovers within the region R of the closed curve C, then the crossover point set X will always contain an even number of crossover points, as any crossover entering R must have a corresponding crossover leaving R.

Figure 11B:
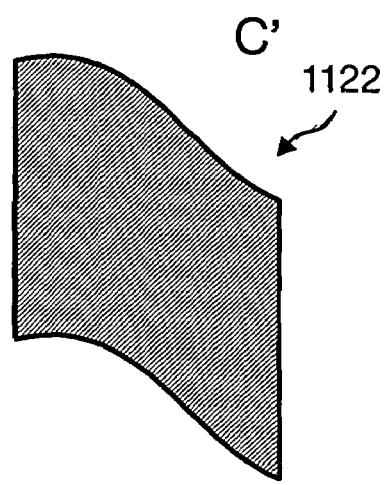

In the next step 510, the transformed curve set C' 1122 shown in FIG. 11B is constructed by assembling closed loops of intervals along C and P delimited by crossover points $X_n$. For instance, the transformed, curve set C' 1122 is assembled from the following curve intervals shown in FIG. 11A:
 a) interval 1114 along C between X1 and X2,
 b) interval 1116 along P between X2 and X3,
 c) interval 1118 along C between X3 and X4,
 d) interval 1120 along P between X4 and X1.

Curve intervals are directed according to crossover point ordering, and adjacent intervals are joined at crossover points. The complete loop returns to the start point $X_1$, reclosing the transformed curve. This example results in a transformed curve set C' 1122 with a single closed curve member, however multiple C' members may as easily be obtained, and there is not necessarily any correspondence between the cardinality of C and the cardinality of C'.

In step 512, the transformed closed set of curves are displayed on a monitor and/or printed. Afterwards, the processing terminates at step 514.

Figure 6:
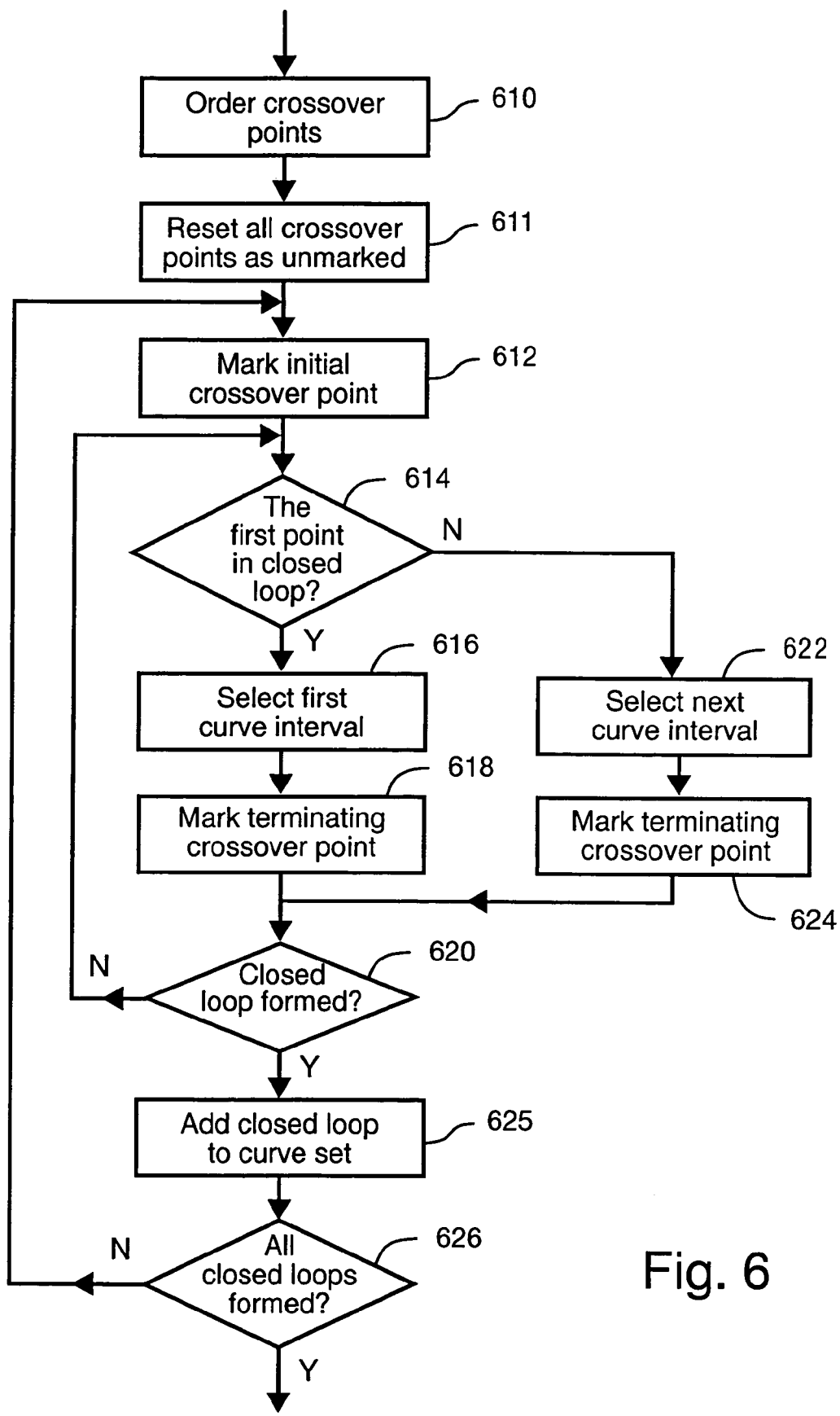
FIG. 6 is a flow diagram showing in more detail the step 510 of FIG. 5

Turning now to FIG. 6, there is shown the step 510 of FIG. 5 in more detail. In step 610, all the crossover points within the set of crossover points X are ordered in accordance with a predetermined order. The ordering of crossover points within X is independent of intersection point ordering. In the preferred embodiment, crossover points are ordered according to their position along C in a clockwise direction (note that each crossover member of X has a defined position along both P and C) to ensure consistency and reproducibility.

In step 611, the transformed curve set C' is set to empty and all the crossover points Xn are marked as "unvisited". In step 612, the set of crossover points is examined in order, and a new transformed curve is started at an "unvisited" crossover point $X_1$, that is highest in the order. This "unvisited" crossover is then marked as "visited".

In decision block 614, a check is made to determine whether or not the crossover point last marked as "visited" is the first crossover point $X_1$ in the current closed loop. If decision block 614 returns false (No), then processing continues at step 622. Otherwise processing continues at step 616. In step 616, the first curve interval of the current loop selected, delimited by crossover points. This selection process 616 selects the curve interval along C that commences at the first crossover point $X_1$ and that proceeds in the forward direction and terminates at the next adjacent unmarked crossover point $X_2$. In the next step 618, the terminating crossover point $X_2$ is marked as "visited".

In the decision block 620, a check is made whether or not a closed loop has been formed. This is determined by checking whether the last mentioned terminating crossover point $X_n$ is the same as the first crossover point $X_1$. If the decision block 620 returns true (Yes), then processing continues at step 625. Otherwise processing continues at decision block 614.

If decision block 614 returns false, namely when the last marked crossover point is not the first crossover point $X_1$ in the closed loop, then processing continues at step 622. In step 622, the next curve interval in the current loop is selected delimited by crossover points. This selection process 622 selects the curve interval along C or P that commences at the last marked terminating crossover point and terminates at an unmarked adjacent crossover point. This selection process 622 can thus choose the next curve interval from the four curve intervals available. The selection process selects the first interval encountered around the last marked terminating crossover point in the anticlockwise direction. In the next step 624, the unmarked adjacent crossover point of the selected interval is marked as "visited" and the processing continues at decision block 620. If the decision block 620 determines a closed loop has been formed, then the processing continues at step 625. Otherwise the steps 614, 622, 624 and 620 continue until the transformed loop is formed. In step 625, the transformed closed curve is added to the transformed curve set C'.

Given that crossover points by definition result in intervals belonging to alternating curve sets (C, P, C, P and so on) around any crossover point $X_n$, then the first interval encountered around $X_2$ in the anticlockwise direction must belong to P. Also, intervals along C will always be followed in the forward direction, however, intervals along P may be followed in either the positive or negative directions. During the first pass of step 622 the interval $X_2X_3$ will be selected. The next interval selected by step 622 is interval $X_3X_4$. Arriving at $X_4$, the first interval in anticlockwise order belongs to P, and thus the next pass of step 622 selects interval $X_4X_1$. As the next crossover point $X_n$ is $X_1$, the curve's starting point, a complete loop has been traversed and the curve is closed and added to the transformed curve set C'. Each terminating crossover point $X_n$ is marked as "visited" once a curve interval has been selected and processed.

In the decision block 626, a check is made whether or not all closed loops have been formed. This is preferably determined by checking whether all the crossover points $X_n$ are marked as "visited". If the decision block 626 returns true (Yes), then processing continues at step 512 and the transformed curve set C' is complete. Otherwise the processing is returned to step 612.

The preferred method has the advantage that it is applicable to general surfaces, and assumes minimal dependency between the source and target curve sets, beyond their existing on the same surface. The transformation may be safely applied to arbitrary outline shapes provided that they have no self-crossovers.

Moreover, the transformation process is consistent, reproducible and controlled so that it can be applied to any outline shape, without the need for intervention by the user beyond the setting of certain parameters. The pattern curve set may be defined implicitly, and calculated on demand to fit the region occupied by the source curve set.

In addition, the transformed curve set is preferably alternating, in the sense that neighboring closed regions may touch at common points but do not overlap or intersect. Consequently, a regularly spaced pattern set will result in a set of regularly spaced closed curves alternating with regularly spaced vacant areas. This allows artistic effects such as striping, gradient and checkerboard to be applied to outline shapes.

EXAMPLES

The following examples are simply provided for illustrative purposes of the preferred method and other closed curve sets C and patterns P can be employed without departing from the scope and spirit of the invention.

Figure 9A:
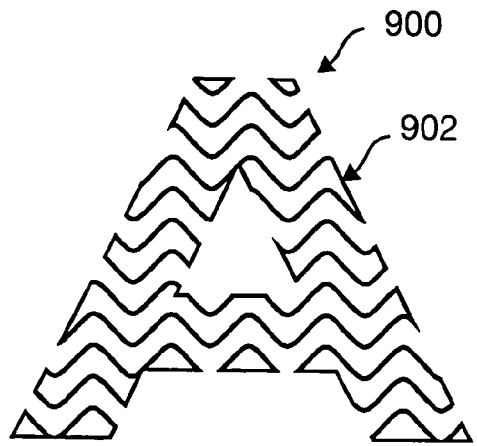
FIG. 9A illustrates C' the result of intersecting C of FIGS. 7A and P of FIG. 8.
Figure 9B:
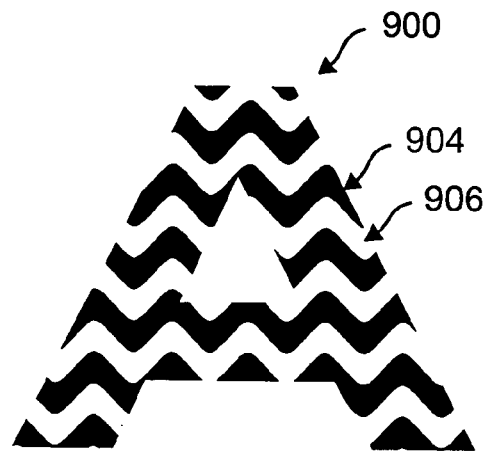
FIG. 9B illustrates the filled counterpart of FIG. 9A.

FIG. 9A shows the result of the implementation of the preferred method on the text characters shown in FIG. 7A using the pattern shown in FIG. 8. Specifically, FIG. 9A shows the result of transforming the curve set C 700 with the pattern P 800, giving the transformed curve set C' 900. The transformed curve set C' 900 encloses a region R' 902. In FIG. 9B, this region R' may be filled resulting in filled regions 904 which alternate with vacant areas 906. These filled regions do not overlap or intersect with other filled regions, but may share common points.

Figure 10A:
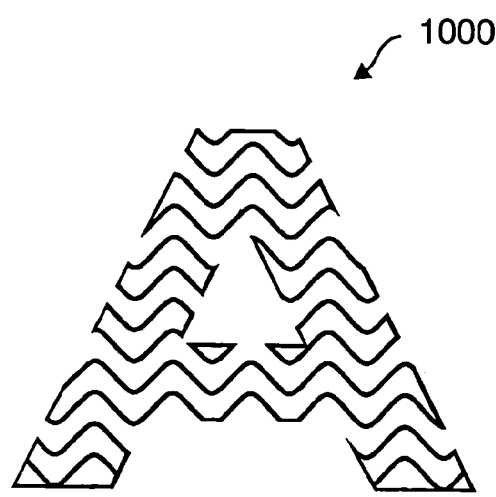
FIG. 10A illustrates Ci' the inverted result of intersecting C of FIGS. 7A and P of FIG. 8.
Figure 10B:
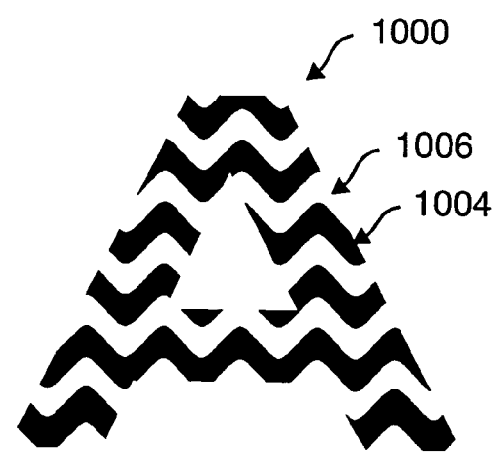
FIG. 10B illustrates the filled counterpart of FIG. 10A.

Shown in FIGS. 10A and 10B are inverted transformed curve sets Ci' 1000 created by transforming curve set C 700 with the pattern set P 800. The filled region Ri' enclosed by Ci' 1000 is shown as 1004. It can be seen that filled regions 904 described by C' become vacant areas in Ci' 1006, and that vacant areas 906 described by C' 900 become filled areas 1004 in Ci' 1000. Again, filled regions 1004 do not overlap or intersect with each, but may share common points.

Figure 12:
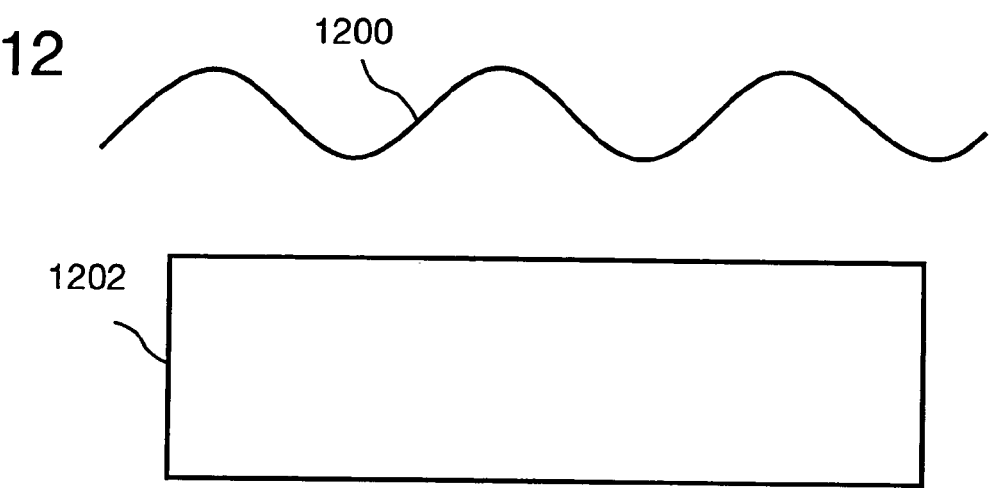
FIG. 12 illustrates an example of null transformed curve set C' from a single pattern P curve intersected with C.

Turning now to FIG. 12, there is shown non-intersecting first curve sets C 1202 and P 1200 that result in the empty curve set C' following transformation. As there are no intersection points, there can be no crossover points, and therefore no new transformed curves are assembled.

Figure 13:
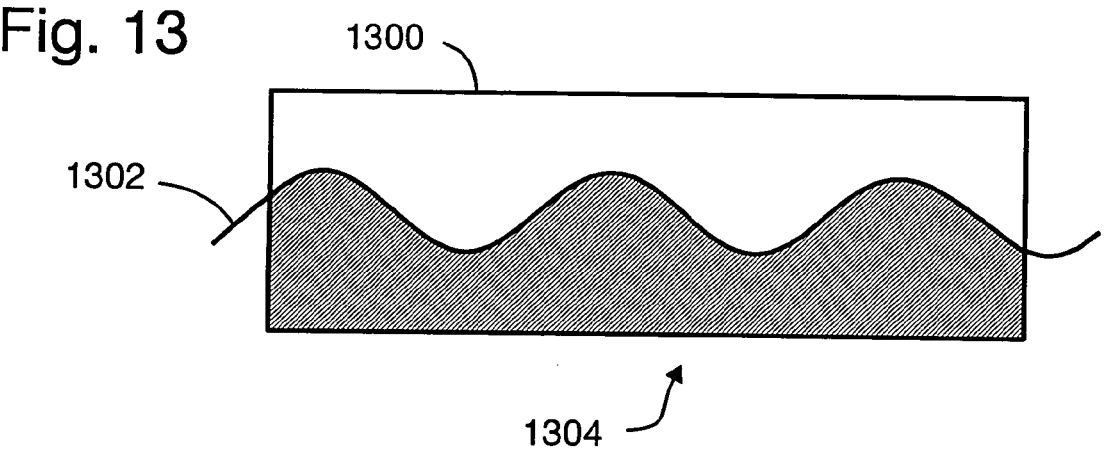
FIG. 13 illustrates an example of a transformed curve set C' from a single pattern P curve intersected with C.

FIG. 13 shows intersecting curve sets C 1300 and P 1302 that result in a transformed curve set C' with a single member 1304. This is similar to the result illustrated in FIG. 11A.

Figure 14:
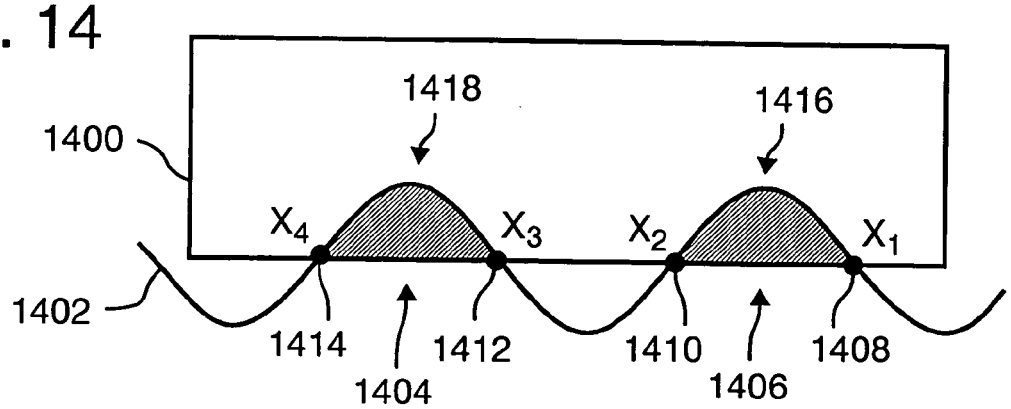
FIG. 14 illustrates another example of a transformed curve set C' from a single pattern P curve intersected with C.

Turning now to FIG. 14, there is shown intersecting curve sets C 1400 and P 1402 that result in a transformed curve set C' with multiple members 1404 & 1406. Note that in all three cases shown in FIGS. 12 to 14 the curve sets C and P are similar but are in different relationships to each other, giving markedly different transformation results.

In the example illustrated in FIG. 14, the crossover point $X_1$ 1408 is examined first, and the interval $X_1X_2$ along C is traversed. At $X_2$ 1410 the interval $X_2X_1$ along P is chosen, leading back to the starting point $X_1$ and closing the transformed curve 1416 that is added to C'. At this stage $X_1$ has been examined as a candidate for a new transformed curve, and $X_1$ and $X_2$ have been visited. $X_2$ is examined next, but is ignored as it has already been visited.

The crossover point $X_3$ 1412 is next examined and is found to be unvisited. A new transformed curve is started at $X_3$, and the interval $X_3X_4$ along C is traversed. At $X_4$ 1414 the interval $X_4X_3$ along P is chosen, leading back to this transformed curve's starting point and closing the transformed curve 1418 that is added to C'. At this stage $X_1$, $X_2$ and $X_3$ have been examined as candidates for new transformed curves, and $X_1$, $X_2$, $X_3$ and $X_4$ have been visited. $X_4$ is examined next, but is ignored as it has already been visited, and the transformed curve set C' is complete.

Figure 15A:
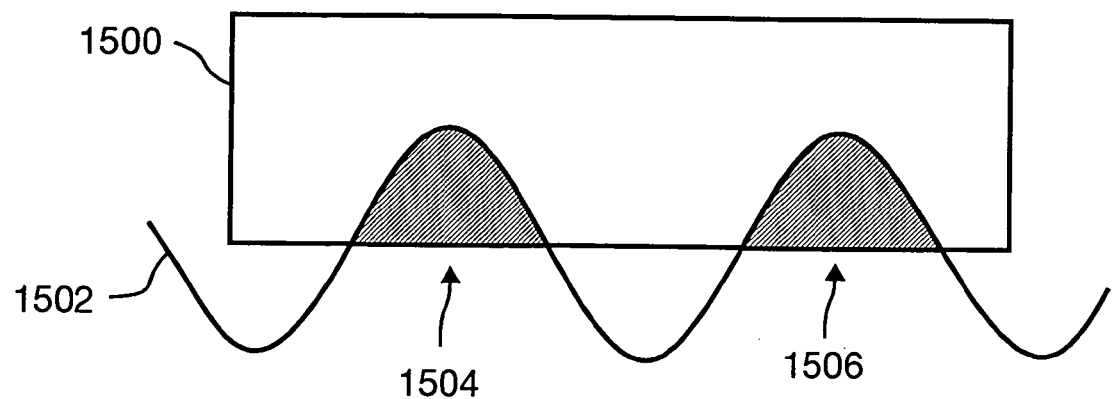
FIGS. 15A and 15B illustrate the result of inverting a transformed curve set C'.
Figure 15B:
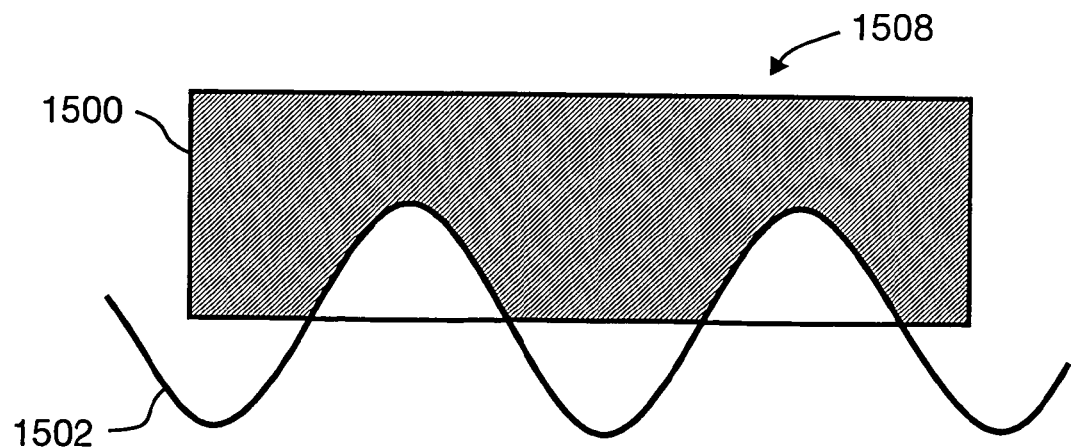

FIGS. 15A and 15B demonstrate that the cardinality of C' and the cardinality of Ci' are not necessarily the same. The same curve set C 1500 and pattern set P 1502 is used in both cases, but C' yields a transformed curve set with two members curves 1504 and 1506, while the inverted transformed curve set Ci' has only one member 1508.

Figure 16:
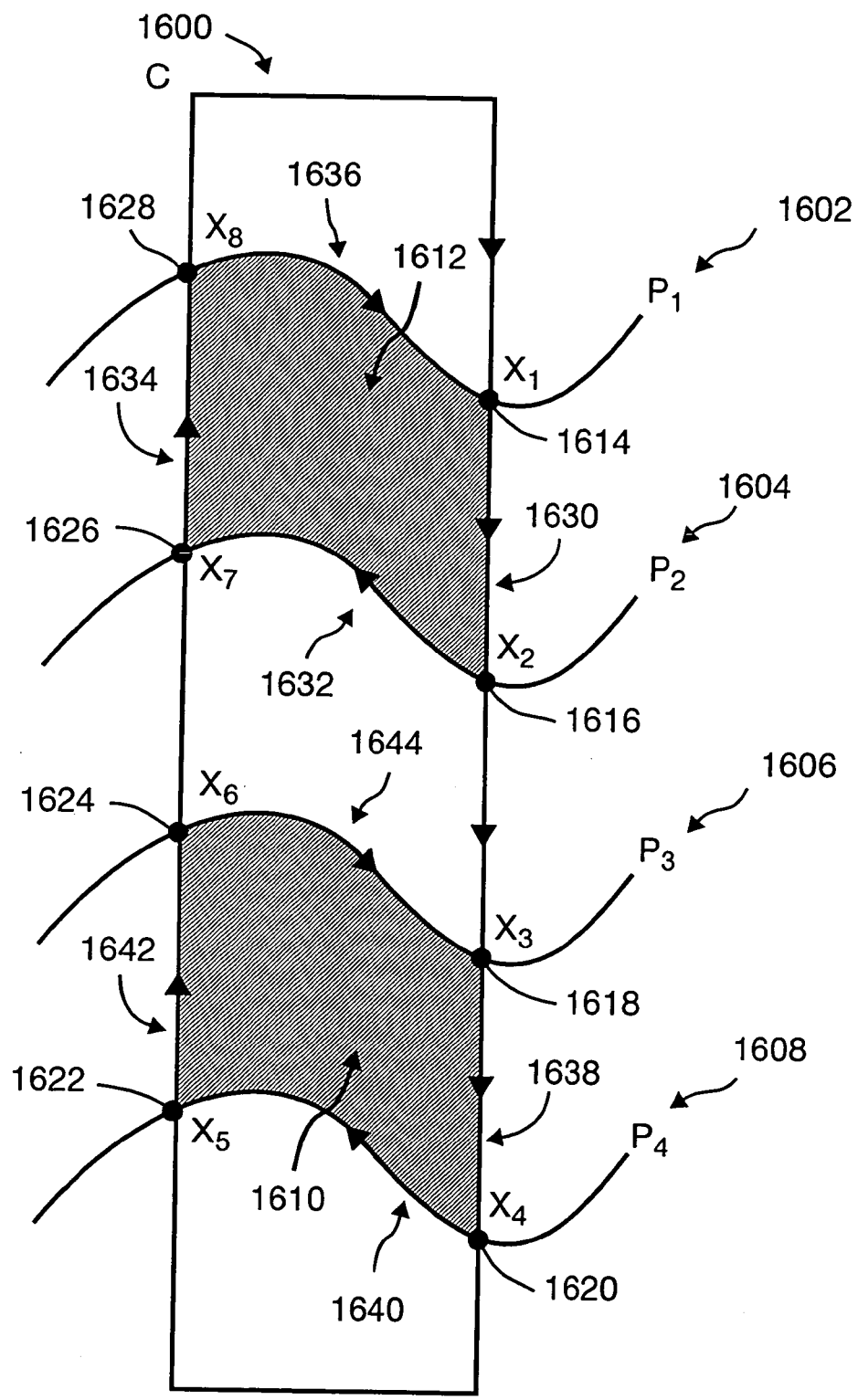
FIG. 16 illustrates the order of processing for multiple C' regions.

FIG. 16 illustrates the complete transformation process of curve set C 1600 and pattern set P composed of curves $P_1$ 1602, $P_2$ 1604, $P_3$ 1606 and $P_4$ 1608 into the transformed curve set C' composed of two curves 1612 and 1610. Following the intersection of C with P, the following crossover point set X is obtained and ordered as follows in the forward direction around C: $X_1$ 1614, $X_2$ 1616, $X_3$ 1618, $X_4$ 1620, $X_5$ 1622, $X_6$ 1624, $X_7$ 1626 and $X_8$ 1628. The transformed curves are assembled in the following order:

a) interval $X_1X_2$ 1630,
b) interval $X_2X_7$ 1632,
c) interval $X_7X_8$ 1634,
d) interval $X_8X_1$ 1636,
e) interval $X_3X_4$ 1638,
f) interval $X_4X_5$ 1640,
g) interval $X_5X_6$ 1642,
h) interval $X_6X_3$ 1644, following which two new transformed curves 1610 and 1612 have been added to C' and all the crossover points $X_n$ have been visited.

Figure 17:
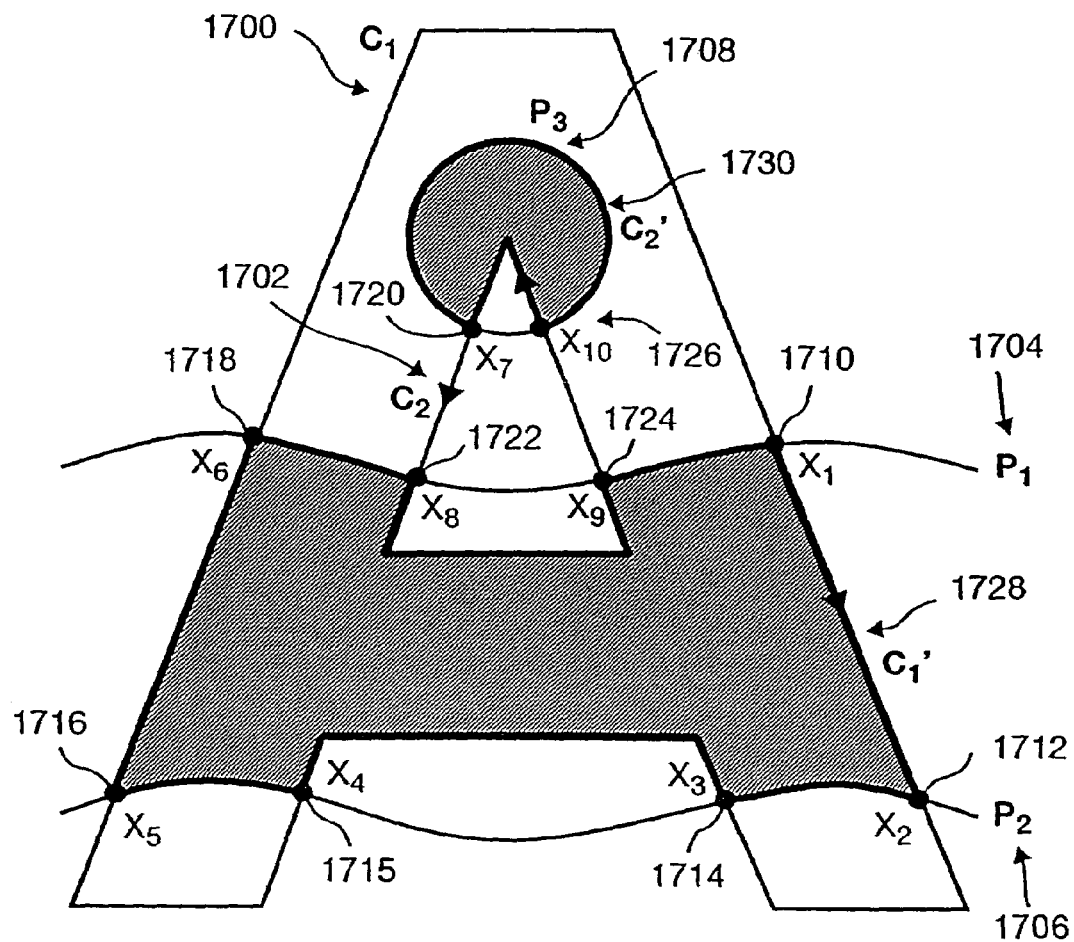
FIG. 17 illustrates the order of processing for multiple C' regions in the presence of a hole.

FIG. 17 illustrates the behaviour of the transformation process in the presence of holes. Curve set C consists of two distinct non-intersecting curves 1700 and 1702. The interior curve $C_2$ 1702 has a forward direction opposite to that of the exterior curve $C_1$ 1700 and defines a hole in region R. The pattern curve set P consists of three distinct non-intersecting curves $P_1$ 1704, $P_2$ 1706 and $P_3$ 1708. $P_3$ is closed and totally contained within the region bounded by exterior curve $C_1$, but is valid as it is continuous within R, and does not intersect itself or any other member of P. In this example, the crossover points are ordered in a clockwise direction around $C_1$ and in an anticlockwise direction around $C_2$, and thus form the ordered set $X_1$ 1710, $X_2$ 1712, $X_3$ 1714, $X_4$ 1715, $X_5$ 1716, $X_6$ 1718, $X_7$ 1720, $X_8$ 1722, $X_9$ 1724 and $X_{10}$ 1726. Starting at the first point $X_1$ a new transformed curve $C_1'$ 1728 is created, and is assembled in the following order:

a) interval $X_1 X_2$ along $C_1$,
b) interval $X_2 X_3$ along $P_2$,
c) interval $X_3 X_4$ along $C_1$,
d) interval $X_4 X_5$ along $P_2$,
e) interval $X_5 X_6$ along $C_1$,
f) interval $X_6 X_8$ along $P_1$,
g) interval $X_8 X_9$ along $C_2$,
h) interval $X_9 X_1$ along $P_1$.

The next unvisited point in the ordered set X is $X_7$, from which a new transformed curve $C_2'$ 1730 is assembled. In this case, the forward interval along $C_2 X_7 X_8$ leads to a visited point $X_8$, so the method backtracks to the $C_2$ point immediately prior to $X_7$, which in this case is the crossover point $X_{10}$. The crossover point $X_{10}$ is now treated as the starting point for $C_2'$, and the method proceeds as for the usual case. $C_2'$ is assembled in the following order:

a) interval $X_{10} X_7$ along $C_2$,
b) interval $X_7 X_{10}$ along $P_3$.

Following this all points X have been visited and the transformed curve set C' is complete.

Figure 18A:
FIGS. 18A to 18C illustrate various transformations that can be achieved using different P base shapes.
Figure 18B:
Figure 18C:
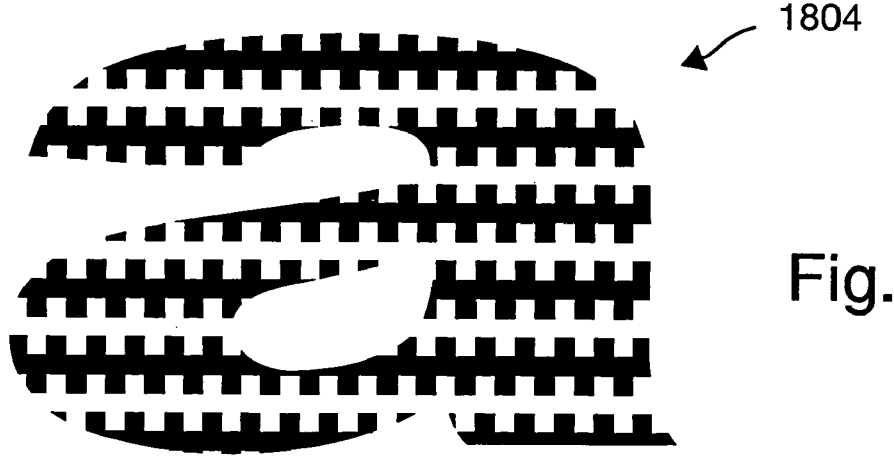

By way of further example, FIGS. 18A to 18C illustrate various transformations of the curve set C 1800 with pattern sets composed of different base shapes. The transformed curve set C' 1802 shows the transformation resulting from a pattern set derived from a triangular wave shape. The transformed curve set C' 1804 shows the transformation resulting from a pattern set derived from a square wave shape.

Figure 19:
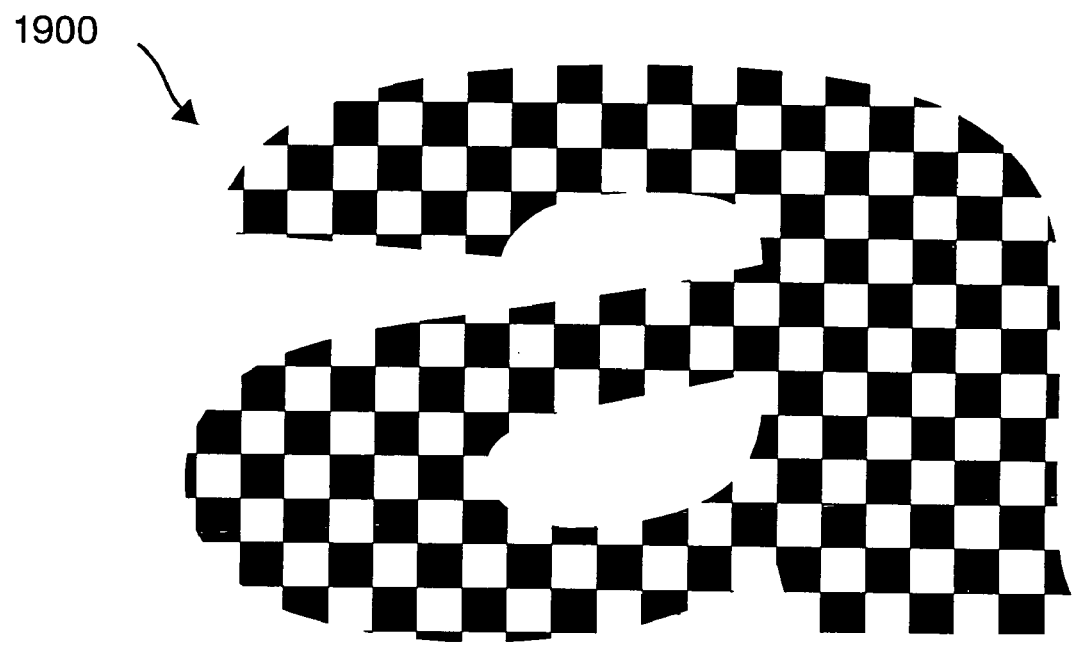
FIG. 19 illustrates a transformation utilising a checkerboard effect.

FIG. 19 illustrates a further transformation of the curve set C 1800 (FIG. 18A). The transformed curve set C' 1900 shows a checkerboard effect. The checkerboard effect is achieved during the filling operation and is not part of the transformation as such.

Figure 20:
FIG. 20 illustrates a transformation utilising a gradient effect.

FIG. 20 illustrates a further transformation of the curve set C 1800 (FIG. 18A). The transformed curve set C' 2000 shows a gradient effect. The gradient is applied during the generation of the pattern set P and is not part of the transformation as such.

Preferred Embodiment of Apparatus(s)

Figure 21:
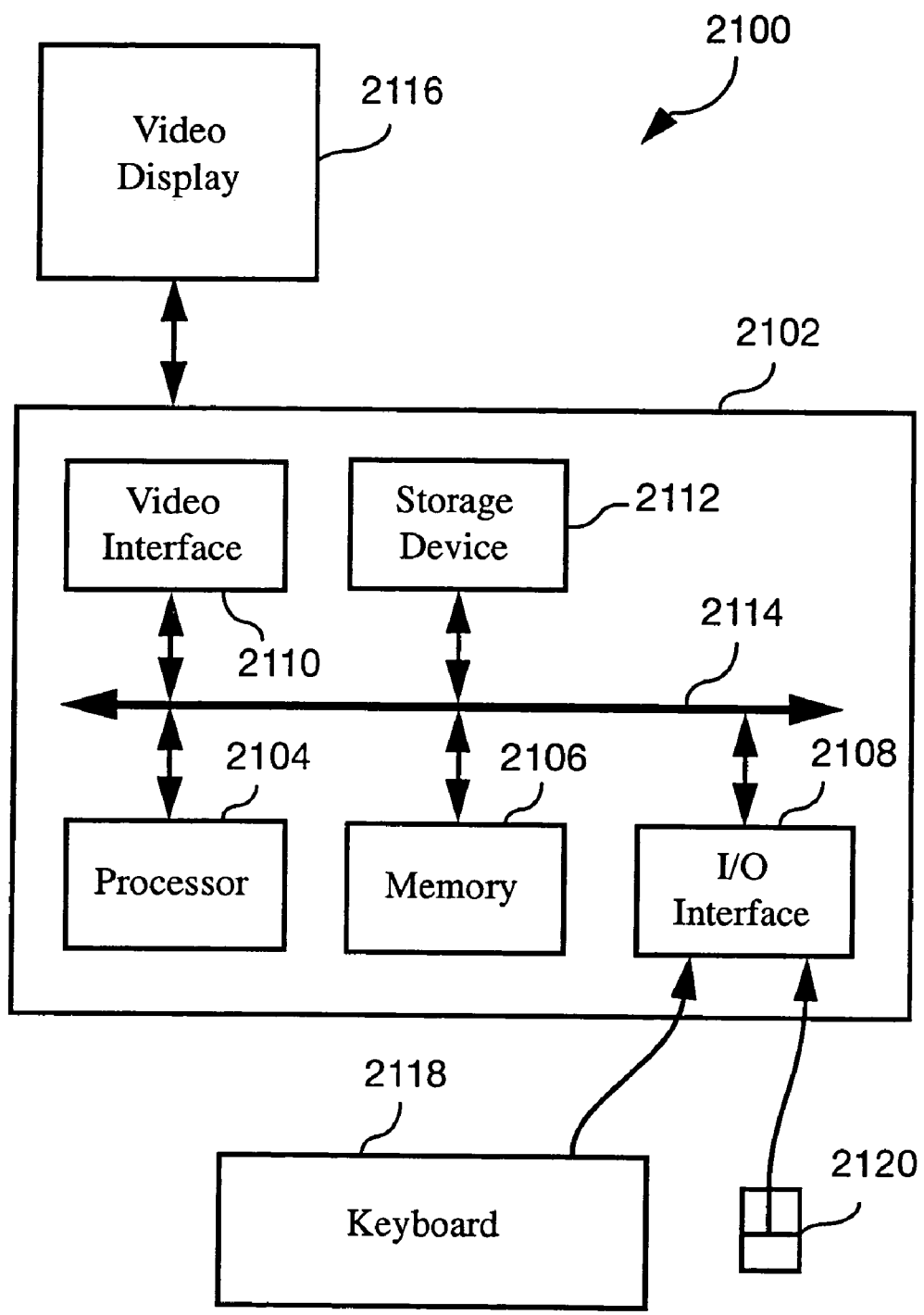
FIG. 21 is a block diagram of a general purpose computer with which the embodiments can be implemented.

The preferred method is preferably practiced using a conventional general-purpose computer, such as the one shown in FIG. 21, wherein the processes of FIGS. 5 and 6 may be implemented as software executing on the computer. In particular, the steps of the method are effected by instructions in the software that are carried out by the computer. The software may be divided into two separate parts; one part for carrying out the transformation method; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for transforming a set of closed first curves defined on a surface in accordance with the embodiments of the invention.

The computer system 2100 consists of the computer 2102, a video display 2116, and input devices 2118, 2120. In addition, the computer system 2100 can have any of a number of other output devices including line printers, laser printers, plotters, and other reproduction devices connected to the computer 2102. The computer system 2100 can be connected to one or more other computers via a communication interface using an appropriate communication channel such as a modem communications path, a computer network, or the like. The computer network may include a local area network (LAN), a wide area network (WAN), an Intranet, and/or the Internet The computer 2102 itself consists of a central processing unit(s) (simply referred to as a processor hereinafter) 2104, a memory 2106 which may include random access memory (RAM) and read-only memory (ROM), input/output (IO) interfaces 2108, a video interface 2110, and one or more storage devices generally represented by a block 2112 in FIG. 21. The storage device(s) 2112 can consist of one or more of the following: a floppy disc, a hard disc drive, a magneto-optical disc drive, CD-ROM, magnetic tape or any other of a number of non-volatile storage devices well known to those skilled in the art.

The video interface 2110 is connected to the video display 2116 and provides video signals from the computer 2102 for display on the video display 2116. User input to operate the computer 2102 can be provided by one or more input devices. For example, an operator can use the keyboard 2118 and/or a pointing device such as the mouse 2120 to provide input to the computer 2102.

The system 2100 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing is merely exemplary of the types of computers with which the embodiments of the invention may be practiced. Typically, the processes of the embodiments, described hereinafter, are resident as software or a program recorded on a hard disk drive (generally depicted as block 2112 in FIG. 21) as the computer readable medium, and read and controlled using the processor 2104. Intermediate storage of the program and pixel data and any data fetched from the network may be accomplished using the semiconductor memory 2106, possibly in concert with the hard disk drive 2112.

In some instances, the program may be supplied to the user encoded on a CD-ROM or a floppy disk (both generally depicted by block 2112), or alternatively could be read by the user from the network via a modem device connected to the computer, for example. Still further, the software can also be loaded into the computer system 2100 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

Applications

The preferred embodiment has many areas of application and a number of examples follow but are not seen as exhaustive. One application is the use of the preferred embodiment in the generation of different typefaces or fonts. Another application of the preferred embodiment is in the generation of patterns on objects in digital videos for special effects.

The foregoing only describes a small number of embodiments of the present invention, however, modifications and/or changes can be made thereto by a person skilled in the art without departing from the scope and spirit of the invention.

I claim:

1. A computer-implemented method for generating a graphical object comprising a plurality of closed loops, the method comprising the steps of:
  a first providing step of providing a set of one or more closed first curves defining a boundary of a surface, wherein the set of one or more closed first curves contains no self-crossover points;
  a second providing step of providing a set of continuous second curves lying on the surface, wherein each of the continuous second curves intersects and crosses over one or more of the closed first curves but does not intersect other ones of the continuous second curves and wherein the set of continuous second curves contains no self-crossover points;
  a first determining step in which the computer determines a set of intersection points, wherein the intersection points are those points where the one or more closed first curves intersect the continuous second curves and which lie on the boundary of the surface;
  a second determining step in which the computer determines a set of crossover points from the determined set of intersection points;
  an assembling step in which the computer assembles, without user intervention, the plurality of closed loops from curve intervals, delimited by adjacent determined crossover points, from the set of one or more closed first curves and the set of continuous second curves in accordance with a predetermined rule, whereby the plurality of closed loops abuts a substantial portion of the boundary of the surface and whereby each of the plurality of closed loops does not share a curve interval with any other one of the closed loops; and
  a filling step in which the computer fills the plurality of closed loops with a fill to produce the graphical object.

2. A method as claimed in claim 1, wherein said assembling step comprises the substeps of:
  an ordering substep of ordering the set of crossover points in accordance with a predetermined order;
  a first marking substep of marking one of the crossover points that is highest in the predetermined order and that has not been previously marked;
  a determining substep of determining if a last marked crossover point is a first point in a closed loop, and if so performing:
    a first selecting substep of selecting a curve interval starting at the first point and terminating at an unmarked crossover point; and
    a second marking substep of marking the terminating crossover point of the selected curve interval; or if not performing:
    a second selecting substep of selecting a curve interval starting at the previous terminating crossover point and terminating at an unmarked crossover point; and
    a third marking substep of marking the current terminating crossover point of the selected curve interval;
  a first repetition substep of repetitively performing the determining substep until the closed loop is formed; and
  a second repetition substep of repetitively performing the first marking, determining and the first repetition substeps until all possible closed loops have been formed.

3. A method as claimed in claim 2, wherein when it is determined in said determining substep that the last marked crossover point is a first point in a closed loop, the curve interval is selected from the set of one or more closed first curves, wherein the selected curve interval starts at the first point, continues in a first direction, and terminates at a next adjacent unmarked crossover point.

4. A method as claimed in claim 3, wherein when it is determined in said determining substep that the last marked crossover point is not a first point in a closed loop, the curve interval is selected from the set of one or more closed first curves or the set of continuous second curves, wherein the selected curve interval is the first curve interval encountered around the last marked crossover point in a second direction starting from the previously selected curve interval and which continues in a third direction and terminates at a next adjacent unmarked crossover point.

5. A method as claimed in claim 4, wherein said substep of ordering the set of crossover points comprises ordering the crossover points according to their position along the set of one or more closed first curves in a fourth direction.

6. A method as claimed in claim 5, wherein the first direction and the fourth direction are in a forward direction, the third direction is either in a positive or a negative direction, and the second direction is in the same direction as a backward direction.

7. A method as claimed in claim 5, wherein the first direction and the fourth direction are in a backward direction, the third direction is either in a positive or a negative direction, and the second direction is in the same direction as a forward direction.

8. A method as claimed in claim 1, wherein the surface is a 2-dimensional surface.

9. A method as claimed in claim 1, wherein the surface is a 3-dimensional surface.

10. A method as claimed in claim 1, wherein said filling step comprises filling the plurality of closed loops with a predetermined color.

11. A method as claimed in claim 1, wherein said second step of providing a set of continuous second curves, comprises the substep of generating the set of continuous second curves.

12. A method as claimed in claim 11, wherein said generating substep comprises inputting parameters.

13. A method as claimed in claim 12, wherein the input parameters comprise one or more of the following: base shapes of the continuous second curves, a period of the continuous second curves, and an amplitude of the continuous second curves.

14. A method as claimed in claim 13, wherein the amplitude of the continuous second curves varies throughout.

15. A method as claimed in claim 1, wherein said second step of providing a set of continuous second curves, comprises the substep of accessing the set of continuous second curves from storage.

16. A method as claimed in claim 1, wherein said second step of providing a set of continuous second curves, comprises the substep of selecting one of a plurality of sets of continuous second curves in response to user input.

17. A method as claimed in claim 1, wherein the set of one or more closed first curves constitutes a character glyph of a font.

18. An apparatus for generating a graphical object comprising a plurality of closed loops, the apparatus comprising:
   first providing means for providing a set of one or more closed first curves defining a boundary of a surface, wherein the set of one or more closed first curves contains no self-crossover points;
   second providing means for providing a set of continuous second curves lying on the surface, wherein each of the continuous second curves intersects and crosses over one or more of the closed first curves but does not intersect other ones of the continuous second curves and wherein the set of continuous second curves contains no self-crossover points;
   first determining means for determining a set of intersection points, wherein the intersection points are those points where the one or more closed first curves intersect the continuous second curves and which lie on the boundary of the surface;
   second determining means for determining a set of crossover points from the set of intersection points;
   assembling means for assembling, without user intervention, the plurality of closed loops from curve intervals, delimited by adjacent determined crossover points, from the set of one or more closed first curves and the set of continuous second curves in accordance with a predetermined rule, whereby the plurality of closed loops abuts a substantial portion of the boundary of the surface and whereby each of the plurality of closed loops does not share a curve interval with any ther one of the closed loops; and
   filling means for filling the plurality of closed loops with a fill to produce the graphical object.

19. An apparatus as claimed in claim 18, wherein said assembling means comprises:
   ordering means for ordering the set of crossover points in accordance with a predetermined order;
   first marking means for marking one of the crossover points that is highest in the predetermined order and that has not been previously marked;
   first selecting means for selecting a curve interval starting at a first point and terminating at an unmarked crossover point;
   second marking means for marking the terminating crossover point of the selected curve interval;
   second selecting means for selecting a curve interval starting at the previous terminating crossover point and terminating at an unmarked crossover point;
   third marking means for marking the current terminating crossover point of the selected curve interval;
   third determining means for determining if a last marked crossover point is the first point in a closed loop, and if so performing the operations of said first selecting means and said second marking means, or if not, performing the operations of said second selecting means and said third marking means;
   means for repetitively performing the operations of said third determining means until the closed loop is formed; and
   means for repetitively performing the operations of said first marking means and said third determining means until all possible closed loops have been formed.

20. An apparatus as claimed in claim 19, wherein said first selecting means selects the curve interval from the set of one or more closed first curves, wherein the selected curve interval starts at the first point, continues in a first direction, and terminates at a next adjacent unmarked crossover point.

21. An apparatus as claimed in claim 20, wherein said second selecting means selects the curve interval from the set of one or more closed first curves or the set of continuous second curves, wherein the selected curve interval is the first curve interval encountered around the last marked crossover point in a second direction starting from the previously selected curve interval and which continues in a third direction and terminates at a next adjacent unmarked crossover point.

22. An apparatus as claimed in claim 21, wherein said ordering means orders the set of crossover points according to their position along the set of one or more closed first curves in a fourth direction.

23. An apparatus as claimed in claim 22, wherein the first direction and the fourth direction are in a forward direction, the third direction is either in a positive or a negative direction, and the second direction is in the same direction as a backward direction.

24. An apparatus as claimed in claim 22, wherein the first direction and the fourth direction are in a backward direction, the third direction is either in a positive or a negative direction, and the second direction is in the same direction as a forward direction.

25. An apparatus as claimed in claim 18, wherein the surface is a 2-dimensional surface.

26. An apparatus as claimed in claim 18, wherein the surface is a 3-dimensional surface.

27. An apparatus as claimed in claim 18, wherein said filling means comprises means for filling the plurality of closed loops with a predetermined color.

28. An apparatus as claimed in claim 18, wherein said second providing means comprises means for generating the set of continuous second curves.

29. An apparatus as claimed in claim 28, wherein said generating means comprises means for inputting parameters.

30. An apparatus as claimed in claim 29, wherein the input parameters comprise one or more of the following: base shapes of the continuous second curves, a period of the continuous second curves, and an amplitude of the continuous second curves.

31. An apparatus as claimed in claim 30, wherein the amplitude of the continuous second curves varies throughout.

32. An apparatus as claimed in claim 18, wherein said second providing means comprises means for accessing the set of continuous second curves from storage.

33. An apparatus as claimed in claim 18, wherein said second providing means comprises means for selecting one of a plurality of sets of continuous second curves in response to user input.

34. An apparatus as claimed in claim 18, wherein the set of one or more closed first curves constitutes a character glyph of a font.

35. A computer program product comprising a computer readable medium including a computer program for generating a graphical object comprising a plurality of closed loops, the computer program product comprising:
   first providing means for providing a set of one or more closed first curves defining a boundary of a surface, wherein the set of one or more closed first curves contains no self-crossover points;
   second providing means for providing a set of continuous second curves lying on the surface, wherein each of the continuous second curves intersects and crosses over one or more of the closed first curves but does not intersect other ones of the continuous second curves and wherein the set of continuous second curves contains no self-crossover points;

first determining means for determining a set of intersection points, wherein the intersection points are those points where the one or more closed first curves intersect the continuous second curves and which lie on the boundary of the surface;

second determining means for determining a set of crossover points from the set of intersection points;

assembling means for assembling, without user intervention, the plurality of closed loops from curve intervals, delimited by adjacent determined crossover points, from the set of one or more closed first curves and the set of continuous second curves in accordance with a predetermined rule, whereby the plurality of closed loops abuts a substantial portion of the boundary of the surface and whereby each of the plurality of closed loops does not share a curve interval with any other one of the closed loops; and filling means for filling the plurality of closed loops with a fill to produce the graphical object.

36. A computer program product as claimed in claim 35, wherein said assembling means comprises:

ordering means for ordering the set of crossover points in accordance with a predetermined order;

first marking means for marking one of the crossover points that is highest in the predetermined order and that has not been previously marked;

first selecting means for selecting a curve interval starting at a first point and terminating at an unmarked crossover point;

second marking means for marking the terminating crossover point of the selected curve interval;

second selecting means for selecting a curve interval starting at the previous terminating crossover point and terminating at an unmarked crossover point;

third marking means for marking the current terminating crossover point;

third determining means for determining if the last marked crossover point is the first point in a closed loop, and if so performing the operations of said first selecting means and said second marking means, or if not, performing the operations of said second selecting means and said third marking means;

means for repetitively performing the operations of said third determining means until the closed loop is formed; and means for repetitively performing the operations of said first marking means and said third determining means until all possible closed loops have been formed.

37. A computer program product as claimed in claim 36, wherein said first selecting means selects the curve interval from the set of one or more closed first curves, wherein the selected curve interval starts at the first point, continues in a first direction, and terminates at a next adjacent unmarked crossover point.

38. A computer program product as claimed in claim 37, wherein said second selecting means selects the curve interval from the set of one or more closed first curves or the set of continuous second curves, wherein the selected curve interval is the first curve interval encountered around the last marked crossover point in a second direction starting from the previously selected curve interval and which continues in a third direction and terminates at a next adjacent unmarked crossover point.

39. A computer program product as claimed in claim 38, wherein said ordering means orders the set of crossover points according to their position along the set of one or more closed first curves in a fourth direction.

40. A computer program product as claimed in claim 39, wherein the first direction and the fourth direction are in a forward direction, the third direction is either in a positive or a negative direction, and the second direction is in the same direction as a backward direction.

41. A computer program product as claimed in claim 39, wherein the first direction and the fourth direction are in a backward direction, the third direction is either in a positive or a negative direction, and the second direction is in the same direction as a forward direction.

42. A computer program product as claimed in claim 35, wherein the surface is a 2-dimensional surface.

43. A computer program product as claimed in claim 35, wherein the surface is a 3-dimensional surface.

44. A computer program product as claimed in claim 35, wherein said filling means comprises means for filling the plurality of closed loops with a predetermined color.

45. A computer program product as claimed in claim 35, wherein said second providing means comprises means for generating the set of continuous second curves.

46. A computer program product as claimed in claim 45, wherein said generating means comprises means for inputting parameters.

47. A computer program product as claimed in claim 46, wherein said input parameters comprise one or more of the following: base shapes of the continuous second curves, a period of the continuous second curves, and an amplitude of the continuous second curves.

48. A computer program product as claimed in claim 47, wherein the amplitude of the continuous second curves varies throughout.

49. A computer program product as claimed in claim 35, wherein said second providing means comprises means for retrieving the set of continuous second curves from storage.

50. A computer program product as claimed in claim 35, wherein said second providing means comprises means for selecting one of a plurality of sets of continuous second curves in response to user input.

51. A computer program product as claimed in claim 35, wherein the set of one or more closed first curves constitutes a character glyph of a font.

52. A computer-implemented method of modifying a typeface, font, or character, the method comprising the steps of:

a first providing step of providing a set of one or more closed first curves defining a boundary of a surface of the typeface, font, or character, wherein the set of one or more closed first curves contains no self-crossover points;

a second providing step of providing a set of continuous second curves lying on the surface, wherein each of the continuous second curves intersects and crosses over one or more of the closed first curves but does not intersect other ones of the continuous second curves and wherein the set of continuous second curves contains no self-crossover points;

a first determining step in which the computer determines a set of intersection points, wherein the intersection points are those points where the one or more closed first curves intersect the continuous second curves and which lie on the boundary of the surface;

a second determining step in which the computer determines a set of crossover points from the determined set of intersection points;

an assembling step in which the computer, without user intervention, assembles a plurality of closed loops from curve intervals, delimited by adjacent determined crossover points, from the set of one or more closed first curves and the set of continuous second curves in accordance with a predetermined rule, whereby the plurality of closed loops abuts a substantial portion of the boundary of the surface and whereby each of the plurality of closed loops does not share a curve internal with any other one of the closed loops; and a filling step of filling the plurality of closed loops with a fill to form the modified typeface, font, or character.

53. An apparatus for modifying a typeface, font, or character, the apparatus comprising:

first providing means for providing a set of one or more closed first curves defining a boundary of a surface of the typeface, font, or character, wherein the set of one or more closed first curves contains no self-crossover points;

second providing means for providing a set of continuous second curves lying on the surface, wherein each of the continuous second curves intersects and crosses over one or more of the closed first curves but does not intersect other ones of the continuous second curves and wherein the set of continuous second curves contains no self-crossover points;

means for determining a set of intersection points, wherein the intersection points are those points where the one or more closed first curves intersect the continuous second curves and which lie on the boundary of the surface;

means for determining a set of crossover points from the set of intersection points;

assembling means for assembling, without user intervention, a plurality of closed loops from curve intervals, delimited by adjacent determined crossover points, from the set of one or more closed first curves and the set of continuous second curves in accordance with a predetermined rule, whereby the plurality of closed loops abuts a substantial portion of the boundary of the surface and whereby each of the plurality of closed loops does not share a curve interval with any other one of the closed loops; and filling means for filling the plurality of closed loops with a fill to form the modified typeface, font, or character.

54. A computer program product comprising a computer readable medium including a computer program for modifying a typeface, font, or character, the computer program product comprising:

first providing means for providing a set of one or more closed first curves defining a boundary of a surface of the typeface, font, or character, wherein the set of one or more closed first curves contains no self-crossover points;

second providing means for providing a set of continuous second curves lying on the surface, wherein each of the continuous second curves intersects and crosses over one or more of the closed first curves but does not intersect other ones of the continuous second curves and wherein the set of continuous second curves contains no self-crossover points;

means for determining a set of intersection points, wherein the intersection points are those points where the one or more closed first curves intersect the continuous second curves and which lie on the boundary of the surface;

means for determining a set of crossover points from the set of intersection points;

assembling means for assembling, without user intervention, a plurality of closed loops from curve intervals, delimited by adjacent determined crossover points, from the set of one or more closed first curves and the set of continuous second curves in accordance with a predetermined rule, whereby the plurality of closed loops abuts a substantial portion of the boundary of the surface and whereby each of the plurality of closed loops does not share a curve interval with any other one of the closed loops; and filling means for filling the plurality of closed loops with a fill to form the modified typeface, font, or character.

55. A method of modifying a typeface, font, or character, the method comprising the computer-implemented steps of:

receiving a selection from a user of a set of one or more closed first curves defining a boundary of a surface of the typeface, font, or character, wherein the set of one or more closed first curves contains no self-crossover points;

receiving a selection from the user of a set of continuous second curves lying on the surface, wherein each of the continuous second curves intersects and crosses over one or more of the closed first curves but does not intersect other ones of the continuous second curves and wherein the set of continuous second curves contains no self-crossover points;

determining a set of intersection points, wherein the intersection points are those points where the one or more closed first curves intersect the continuous second curves and which lie on the boundary of the surface;

determining a set of crossover points from the set of intersection points;

selecting unmarked adjacent crossover points from the set of determined crossover points to a form a closed loop;

marking the selected adjacent crossover points;

repetitively performing the selecting and marking steps, without intervention from the user, until a set of closed loops have been formed, wherein the set of closed loops abuts a substantial portion of the boundary of the surface; and filling the set of closed loops with a fill to form the modified typeface, font, or character.

56. Apparatus for modifying a typeface, font, or character, the apparatus comprising:

means for receiving a selection of a set of one or more closed first curves defining a boundary of a surface of the typeface, font, or character, wherein the set of one or more closed first curves contains no self-crossover points;

means for receiving a selection of a set of continuous second curves lying on the surface, wherein each of the continuous second curves intersects and crosses over one or more of the closed first curves but does not intersect other ones of the continuous second curves and wherein the set of continuous second curves contains no self-crossover points;

means for determining a set of intersection points, wherein the intersection points are those points where the one or more closed first curves intersect the continuous second curves and which lie on the boundary of the surface;

means for determining a set of crossover points from the set of intersection points;

means for selecting unmarked adjacent crossover points from the set of determined crossover points to a form a closed loop;

means for marking the selected adjacent crossover points;

means for repetitively performing the operations of said selection means and said marking means, without user intervention, until a set of closed loops have been formed, wherein the set of closed loops abuts a substantial portion of the boundary of the surface; and means for filling the set of closed loops with a fill to form the modified typeface, font, or character.

57. A computer program product comprising a computer readable medium including a computer program for modifying a typeface, font, or character, the computer program product comprising:

means for receiving a selection of a set of one or more closed first curves defining a boundary of a surface of the typeface, font, or character, wherein the set of one or more closed first curves contains no self-crossover points;

means for receiving a selection of a set of continuous second curves lying on the surface, wherein each of the continuous second curves intersects and crosses over one or more of the closed first curves but does not intersect other ones of the continuous second curves and wherein the set of continuous second curves contains no self-crossover points;

means for determining a set of intersection points, wherein the intersection points are those points where the one or more closed first curves intersect the continuous second curves and which lie on the boundary of the surface;

means for determining a set of crossover points from the set of intersection points;

means for selecting unmarked adjacent crossover points from the set of determined crossover points to form a closed loop;

means for marking the selected adjacent crossover points;

means for repetitively performing the operations of said selection means and said marking means, without user intervention, until a set of closed loops have been formed, wherein the set of closed loops abuts a substantial portion of the boundary of the surface; and means for filling the set of closed loops with a fill to form the modified typeface, font, or character.

* * * * *